(No Model.)
E. LACHMANN.
ELECTRIC RAILWAY.
No. 563,282. Patented July 7, 1896.
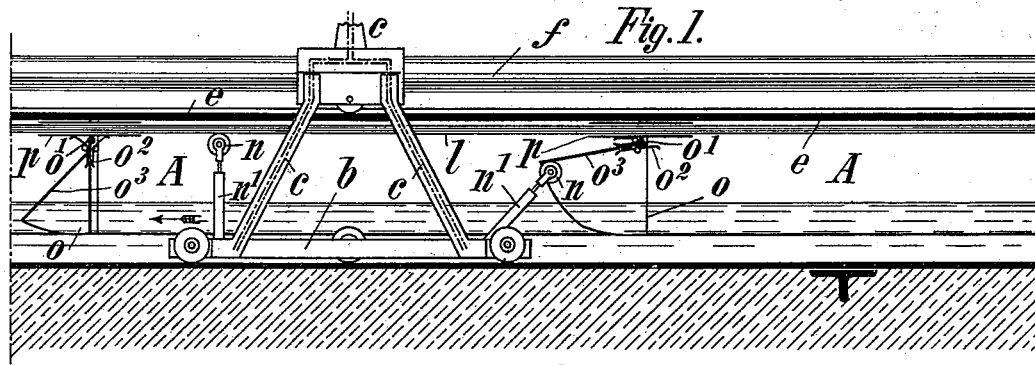
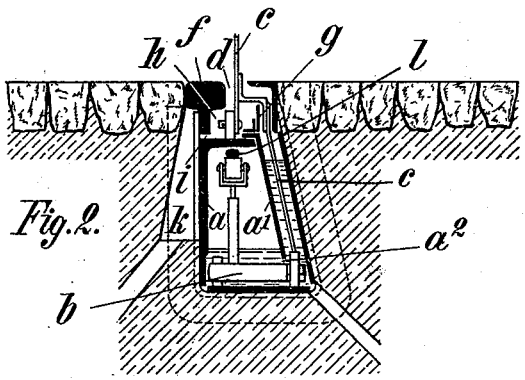
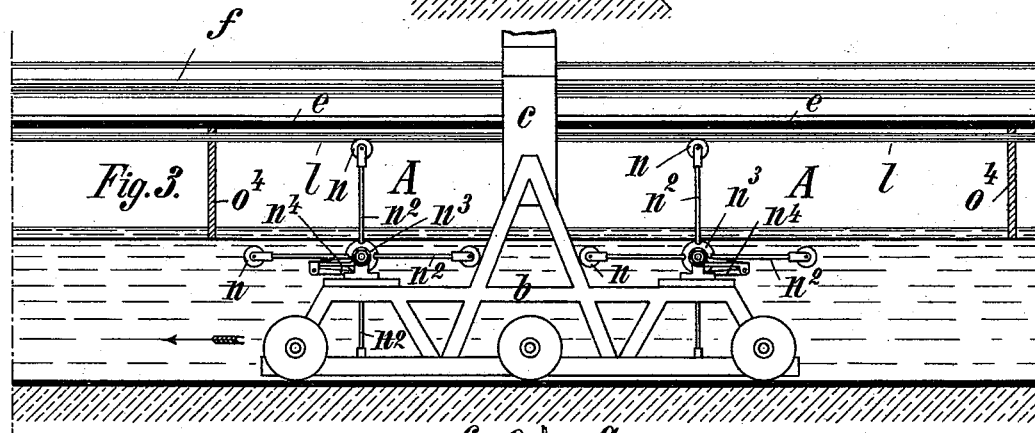
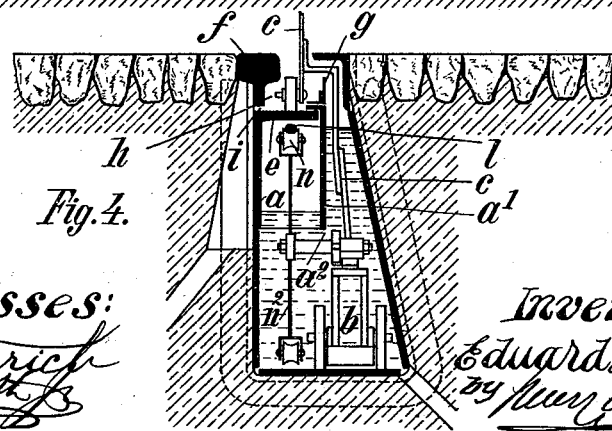
Witnesses:
H. G. Wieterich
Inventor:
Eduard Lachmann
Atty.

UNITED STATES PATENT OFFICE.

EDUARD LACHMANN, OF HAMBURG, GERMANY.

ELECTRIC RAILWAY.

SPECIFICATION forming part of Letters Patent No. 563,282, dated July 7, 1896.

Application filed June 30, 1894. Serial No. 516,182. (No model.)

*To all whom it may concern:*

Be it known that I, EDUARD LACHMANN, a subject of the German Emperor, and a resident of Hamburg, in the German Empire, have invented certain new and useful Improvements in and Relating to Electric Railways; and I do hereby declare the following to be a full, clear, and exact description of the invention, such as will enable others skilled in the art to which it appertains to make and use the same, reference being had to the accompanying drawings, which form a part of this specification.

My invention has relation to underground electric railways in which the electric current is supplied to the electromotor on the car from a bare conductor through suitable contact devices, and my said invention relates more particularly to means for preventing grounding by contact with the bare conductor of water that may accumulate in the underground conduit, or through the flooding of such conduit, as will now be fully described, reference being had to the accompanying drawings, in which—

Figure 1 is a vertical longitudinal section of a portion of an underground conduit, illustrating my invention. Fig. 2 is a like transverse section of the same; and Figs. 3 and 4 are views similar to Figs. 1 and 2, respectively, illustrating a modified arrangement of contact devices.

The underground conduit A is constructed in the form of an air-tight chamber, along the roof $e$ of which is carried the main conductor $l$, an opening or slot $a^2$ being formed in one of its side walls $a'$ along the conduit-floor for the passage of the conductor-arm $c$, that connects the contact-carriage $b$, hereinafter to be described, with the motor on the motor-car. Along the lateral wall $a'$ is formed a passage or slot $d$, hereinafter called the "slot," for the aforesaid connections $c$, said slot merging into an open surface-drain $h$, the bottom of which is formed by the roof $e$ of the conduit A, and a side wall $g$, that constitutes the upper end or entrance of the slot $d$, the foot of an angle-bar projecting over said side wall $g$, so as to prevent water during a rainfall from entering the slot. In other words, the slot $d$ has its entrance in a plane perpendicular to the surface of the road-bed along the upper portion of the surface drain $h$. The latter is connected through suitable openings $i$ with a drainage-chamber $k$, preferably formed along the outer wall $a$ of the conduit A, said drainage-chamber, as well as the slot $d$, being connected with suitable drains, as a sewer.

The object of providing a surface-drainage channel is to avoid surface water flowing into the underground conduit under ordinary conditions of precipitation and to prevent the conduit from being rapidly flooded during a heavy rain-storm, and for the purpose of conducting overflowing water away from the track-rails. The surface-drainage channel has, however, a further advantage, in that it serves as a collector for solid substances that would otherwise reach the underground conduit, such solid substances being removed from time to time, so that sweeping or other like devices usually connected with the contact-carrier in the main conduit may be dispensed with.

Should circumstances arise under which the means provided for draining the surface drain or gutter $h$ become inadequate, and should the water in said drain overflow into the slot $d$ and conduit A, such water could not rise in the air-tight conduit sufficiently to reach the conductor $l$, because the air in said conduit would be gradually compressed until the pressure therein became equal to the pressure of the water in the slot $d$ and drain $h$.

In order to avoid the grounding of the current by contact with water, it may become necessary under certain conditions of the road-bed to resort to a main conduit of considerable depth, and to avoid this I subdivide the said main conduit into a series of air-tight chambers by means of cross partitions or septums, which may be movable or rigid, and have an air-tight connection with the walls $a$ and $a'$ and the roof $e$ of the conduit A, the lower edge of the septums being substantially on a line with the upper edge of the slot $a^2$ in the side wall $a'$ of said conduit, so as not to interfere with the connections between the contact devices for the main conductor and the motor-car. By this means I obtain a series of air-chambers, the length of which may be varied according as circumstances may require, while the depth of the conduit A can be reduced to a minimum. When the road-bed has steep gradients, this subdivision of the conduit A into air-chambers is indispensable, in order to prevent the flooding of the lower levels and the grounding of the currents. There is, however, a further advantage in the aforesaid subdivision of the underground conduit into air-chambers, in that leakages can be more readily located, since only those chambers which are not fluid-tight will fill with water, and when the motor-car passes over such a section the derivation or grounding of the electric current is at once made apparent.

As above stated, the partitions or septums may be made movable or rigid. In Figs. 1 and 2 I have shown them as consisting of a sheet of elastic or flexible waterproof material $o$, hinged to a sleeve $o'$, secured to and insulated from the conductor $l$, the space between said sleeve and roof $e$ of the conduit being closed air-tight in any suitable manner. The vertical edges of the sheet of material are secured air-tight to the side walls $a$ and $a'$ of the conduit A, and between said edges said material is reinforced or provided with a stiffening-plate $o^3$. Of course there will be sufficient material outside of the reinforced or stiffened portion $o^3$ to allow the septums to expand under circumstances to be hereinafter described, and to collapse or fold again when released.

Current may be supplied from the conductor $l$ to a motor on a motor-car in various ways, according as the septums $o$ are movable or rigid. In either case at least two contacts are necessary, in order to provide an uninterrupted connection between the main conductor $l$ and the motor on the motor-car. To this end the conductor $c$ is carried along a rigid arm secured to a wheeled carriage that travels along the surface drain $h$, and to said carriage are secured two coverging arms of a contact-carriage $b$, along which branches of the conductor $c$ are led and connected with contact-wheels $n$ on spring-controlled contact-arms $n'$, one at the forward end and the other at the rear end of the contact-carriage $b$.

In practice, and as shown in Fig. 1, the septums $o$ are preferably held in a normally-inclined position by springs $o^2$, the inclination being always in the direction of travel of the motor-car, so that when one of the contact-wheels reaches an insulated sleeve $o'$ it will yield and travel along one of the leaves of the hinge-spring of a septum and thence along the reinforced or stiffened portion $o^3$ of such septum and lift the same sufficiently to enable the contact-arm $n'$ and its wheel to clear the same, the arm itself yielding, thereby facilitating its passage under the septum. During the passage by a septum, of one of the contact-wheels the other will be in contact with the main conductor $l$, so that the supply of current to the electric motor is not interrupted, as clearly shown in Fig. 1.

When the septums $o^4$ are rigid, as shown in Figs. 3 and 4, I mount on the contact-carriage $b$ two shafts, each provided with a boss having secured thereto four radial arms $n^2$, carrying at their outer end a contact-wheel $n$, the shaft being locked against rotation by a ratchet-wheel $n^3$ and a suitable spring-actuated pawl $n^4$.

In the construction shown in Figs. 3 and 4 the lateral wall $a'$ of the conduit A is made shorter than the like wall in the arrangement shown in Figs. 1 and 2, to suit the increased height of the contact-carriage $b$, as will be readily understood.

When one of the contact-wheels $n$ on one of the radial arms $n^2$ impinges upon a septum $o^4$, the shaft carrying the said arm is revolved until the wheel $n$ has cleared or passed under said septum, and these septums are preferably of such a height as to impart to the shafts a quarter of a revolution, so that when the contact-wheel $n$, impinging upon a septum, has been brought to a proper position to pass under it the succeeding wheel will be in contact with the main conductor $l$, and as there are two shafts, each carrying four contact-arms, one of these arms will at all times be in a position with its wheel in contact with the main conductor.

Having thus described my invention, what I claim as new therein, and desire to secure by Letters Patent, is—

1. In an underground electric railway, a conduit constructed to form an air-tight chamber open along its bottom, a channel leading from said opening to the surface of the road-bed, and a main conductor strung along the roof of said conduit, in combination with a vehicle carrying an electric motor, a wheeled contact-carriage propelled by the vehicle, and traveling within the conduit, said carriage provided with contact devices adapted to contact with the main conductor, and electric conductors connecting said contact device with the electric motor on the vehicle, for the purpose set forth.

2. In an underground electric railway, a conduit divided by septums into a series of air-tight chambers open at their lower end, a slot or channel leading from said opening to the surface of the road-bed, and a main conductor strung along the roof of of the conduit; in combination with a vehicle carrying an electric motor, a wheeled contact-carriage propelled by the vehicle and traveling within the conduit, said carriage provided with contact devices adapted to contact with the main conductor, electrical connections between said contact devices and the electric motor on the vehicle, and means substantially as described for enabling the contact devices to clear the septums, for the purpose set forth.

3. In an underground electric railway, an underground conduit closed at top, a drain extending along the surface of said conduit, slot-rails above and parallel with such conduit, one of said rails forming one of the side walls of the aforesaid drain and a passage out of line with the slot between the rails and above the bottom of the drain, said passage leading into the underground conduit, for the purpose set forth.

4. In an underground electric railway, an underground conduit having converging lateral walls at the surface end to form a slot, a cross-partition below said slot extending from one of said lateral walls, and a vertical partition rising from the end of said cross-partition toward the slot-rails, whereby a surface conduit is formed between the cross-partition and the surface slot and a passage out of line with said slot above the bottom of the surface drain and leading into the main conduit, for the purpose set forth.

5. In an underground electric railway, the combination with the underground conduit constructed to form an air-tight chamber open at its lower end, a slot or channel leading from said open end to the surface of the road-bed, septums dividing the air-chamber into a number of such, and a main conductor strung along the roof of said air-tight chambers; of a vehicle carrying an electric motor, revoluble contact-arms connected and traveling with the vehicle, a contact-wheel on the end of said arms adapted to contact with the main conductor, and suitable electrical connections between the wheels and electric motor, for the purpose set forth.

6. In an underground electric railway, the combination with the underground conduit constructed to form an air-tight chamber open at its lower end, a slot or channel leading from said lower end to the surface of the road-bed, a surface drain below the said slot, and a main conductor strung along the roof of the air-chamber; of a vehicle carrying an electric motor, a wheeled carriage connected with said vehicle and traveling along the surface drain, a contact device connected with said carriage and adapted to contact with the main conductor, and suitable electric connections between the contact device and electric motor, for the purpose set forth.

7. In an underground electric railway, the combination with the underground conduit, a drainage-channel above the same, and a surface slot leading to said channel; of a lateral passage opening into the drain above its bottom and into the conduit at the bottom thereof, for the purpose set forth.

8. In a conductor-channel for electric railways, the combination of an upper air-tight channel-room with a slot $a^2$ in the side wall $a'$, rigid partitions $o^4$ and revoluble arms $n^2$ supporting the contact-rolls $n$, substantially as described.

9. In a conductor-channel for electric railways, the combination with an upper air-tight channel-room with a slot $a^2$ in the side wall $a'$ and a water-trough $h$ above the channel-cover $e$, substantially as specified.

In testimony that I claim the foregoing as my invention I have signed my name, in presence of two witnesses, this 16th day of June, 1894.

EDUARD LACHMANN.

Witnesses:
   DIEDRICH PETERSEN,
   C. L. THEODOR MÜLLER.